(12) United States Patent
Galloway (10) Patent No.: US 11,306,713 B2
(45) Date of Patent: Apr. 19, 2022

(54) HYDRAULIC PUMP WITH SPEED AND PRESSURE COMPENSATION

(71) Applicant: Eaton Intelligent Power Limited, Dublin (IE)

(72) Inventor: Phillip Wayne Galloway, Madison, MS (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 147 days.

(21) Appl. No.: 16/184,507

(22) Filed: Nov. 8, 2018

(65) Prior Publication Data

US 2019/0145390 A1 May 16, 2019

Related U.S. Application Data

(60) Provisional application No. 62/585,855, filed on Nov. 14, 2017.

(51) Int. Cl.
| | | |
|---|---|---|
| *F04B 49/12* | (2006.01) | |
| *F04B 1/128* | (2020.01) | |
| *F04B 49/08* | (2006.01) | |
| *F04B 17/03* | (2006.01) | |
| *F04B 49/20* | (2006.01) | |
| *F04B 1/324* | (2020.01) | |
| *B64D 27/02* | (2006.01) | |
| *B64D 31/14* | (2006.01) | |

(52) U.S. Cl.
CPC .............. *F04B 49/12* (2013.01); *F04B 1/128* (2013.01); *F04B 1/324* (2013.01); *F04B 17/03* (2013.01); *F04B 49/08* (2013.01); *F04B 49/20* (2013.01); *B64D 27/02* (2013.01); *B64D 31/14* (2013.01)

(58) Field of Classification Search
None
See application file for complete search history.

(56) References Cited

U.S. PATENT DOCUMENTS 2,945,449 A * 7/1960 Lefebvre ................. F04B 1/324
91/506
3,350,881 A * 11/1967 D'Amato ................ F04B 1/324
417/222.1

(Continued)

FOREIGN PATENT DOCUMENTS

FR          1466644 A      1/1967

OTHER PUBLICATIONS

"Vickers Engine-Driven Pump for Boeing's B737-600/700/800/900, Model PV3-240-18," Eaton Aerospace Group, TF500-23A, Oct. 2013, 8 pages.

(Continued)

*Primary Examiner* — Peter J Bertheaud
*Assistant Examiner* — Geoffrey S Lee
(74) *Attorney, Agent, or Firm* — Merchant & Gould P.C.

(57) ABSTRACT

A pump system includes a pressure compensator and a speed compensator for controlling the displacement of a variable displacement pump having an inlet and an outlet. The variable displacement pump is driven by a drive shaft powered by an electric motor. The pressure compensator adjusts the displacement of the variable displacement pump based on a pump pressure at the pump outlet. The speed compensator adjusts a maximum magnitude of the displacement of the variable displacement pump based on a speed of the electric motor.

18 Claims, 9 Drawing Sheets

(56) References Cited

U.S. PATENT DOCUMENTS

| | | | | |
|---|---|---|---|---|
| 3,426,686 A * | 2/1969 | Anderson | ............... | H01S 3/09 |
| | | | | 417/201 |
| 3,768,928 A * | 10/1973 | Miller | ................. | F04B 1/324 |
| | | | | 417/213 |
| 3,908,519 A * | 9/1975 | Born | ................. | F01B 3/106 |
| | | | | 92/12.2 |
| 3,935,706 A * | 2/1976 | Stevens | ............... | F04B 49/002 |
| | | | | 60/444 |
| 4,076,459 A * | 2/1978 | Adams | ................ | F04B 1/324 |
| | | | | 417/217 |
| 4,332,531 A * | 6/1982 | Marietta | ............ | F04B 49/08 |
| | | | | 417/218 |
| 4,801,247 A * | 1/1989 | Hashimoto | ........... | F04B 1/324 |
| | | | | 417/213 |
| 5,515,829 A * | 5/1996 | Wear | ................ | F02B 75/22 |
| | | | | 123/446 |
| 6,095,760 A * | 8/2000 | Houtman | ............ | F04B 1/324 |
| | | | | 417/218 |
| 6,354,812 B1 * | 3/2002 | Todd | ................ | F04B 1/324 |
| | | | | 417/269 |
| 2001/0042437 A1 * | 11/2001 | Trimble | ............. | F04B 23/106 |
| | | | | 92/12.2 |

OTHER PUBLICATIONS

"Vickers Inline Pump, Model PV3-240-2F and Model PV3-240-2G," Eaton Aerospace Group, TF500-24A, Oct. 2013, 8 pages.

"A Descriptive Summary of Vickers Inline Pumps and their Applications, Vickers Fluid Systems," Eaton Corporation, 2000, 64 pages.

"S3 Viking Pump, Eaton Model PV3-115-15B," Sep. 29, 2017, 4 pages.

* cited by examiner

HYDRAULIC PUMP WITH SPEED AND PRESSURE COMPENSATION

CROSS-REFERENCE TO RELATED APPLICATIONS

This application claims priority to U.S. Provisional Patent Application 62/585,855 filed Nov. 14, 2017, the disclosure of which is incorporated herein by reference in its entirety.

TECHNICAL FIELD

The present disclosure relates generally to hydraulic pumps. More particularly, the present disclosure relates to hydraulic pump systems and methods for controlling torque demand.

BACKGROUND

Hydraulic pumps can provide a source of power to flight controls, landing gear, and other components on an aircraft. An aircraft typically supplies variable frequency electrical power to electric motor driven hydraulic pumps as a result of the aircraft's engine speed varying during flight. For example, an aircraft's engine speed is high during takeoff and is low during landing. The variable frequency electrical power can create problems for electric motors because as frequency and motor speed increase, motor torque decreases. Accordingly, electric motors may not have enough torque to drive hydraulic pumps operating at maximum displacement.

A solution to this problem has been to convert the variable frequency to a DC current, and to then convert the DC current to an effective AC current that can be used to power the electric motors that drive the hydraulic pumps. However, complex and heavy electronic systems are required for these conversions. Also, these systems are often located in regions of the aircraft exposed to high temperature and therefore electronic heating is a significant problem.

SUMMARY

Aspects of the present disclosure relate to reducing a maximum permitted stroke length of a variable displacement hydraulic pump when a predetermined speed threshold of an electric motor is reached. By limiting the maximum permitted stroke length at the speed threshold, a conventional electric motor can be used to drive the variable displacement hydraulic pump.

In one aspect, the disclosed technology relates to a pump system having a variable displacement pump including an inlet and an outlet. The variable displacement pump includes a drive shaft, and an electric motor for driving rotation of the drive shaft. A pressure compensator adjusts a pump displacement of the variable displacement pump based on a pump pressure at the pump outlet, and a speed compensator adjusts a maximum magnitude of the pump displacement inversely proportional to a rotational speed of the drive shaft once the rotational speed of the drive shaft has exceeded a predetermined speed threshold.

The pressure compensator may include a pressure compensating actuator adapted to receive hydraulic pressure from the pump outlet when a pressure compensator valve is opened. The pressure compensating actuator destrokes a yoke carrying a swashplate in the variable displacement pump when the pump pressure exceeds a predetermined pressure.

The speed compensator may include a displacement limiting actuator adapted to receive hydraulic pressure from the pump outlet when a speed compensation valve is opened. The speed compensation valve can be a metering valve having a variable opening proportional to the speed of the electric motor. The speed compensator includes a fixed displacement pump coupled to the drive shaft and adapted to draw hydraulic fluid from the inlet of the variable displacement pump and to pump the hydraulic fluid through an orifice. A pressure differential across the orifice is proportional to the speed of the electric motor, and when the pressure differential across the orifice exceeds a predetermined amount, a pressure at an upstream side of the orifice opens the speed compensation valve. The hydraulic fluid flows through the orifice into a return line for cooling components of the pump system.

The variable displacement pump may include a rotating group coupled to the drive shaft such that the rotating group rotates in concert with the drive shaft about a drive shaft axis. The rotating group includes a piston block defining a plurality of cylinder bores positioned about the drive shaft axis. The rotating group includes pistons that reciprocate within the cylinder bores to pump hydraulic fluid through the variable displacement pump from the inlet to the outlet, the pistons having piston shoes.

The variable displacement pump may further include a yoke carrying a swashplate, and the piston shoes of the pistons of the rotating group are configured to slide along the swashplate as the rotating group rotates about the drive shaft axis. The yoke is pivotally movable relative to drive shaft axis to adjust a swashplate angle of the swashplate relative to the drive shaft axis.

The speed compensator may include a displacement limiting actuator adapted to move a maximum displacement position of the yoke for decreasing a maximum permitted stroke length allowed by the swashplate, and the pressure compensator includes a pressure compensating actuator adapted to destroke the yoke when a pump pressure at the outlet of the variable displacement pump exceeds a predetermined pressure such that the stroke length of the pistons of the rotating group is less than the maximum permitted stroke length allowed by the swashplate.

The pump system may have a negative yoke moment actuator that applies a negative moment force to offset a positive moment force on the yoke. The electric motor may be adapted to receive variable frequency electrical power from a power source on an aircraft.

In another aspect, the disclosed technology relates to a method of controlling a pump displacement of a variable displacement pump, the variable displacement pump having a yoke carrying a swashplate, the variable displacement pump further having a rotating group being driven by an electric motor to rotate about a drive shaft axis and the yoke being pivotally movable relative to the drive shaft axis. The method may include establishing a maximum displacement position for the yoke; determining whether the speed of the electric motor exceeds a predetermined speed; when the speed of the electric motor exceeds the predetermined speed, actuating a displacement limiting actuator for pivoting the yoke toward a minimum or no displacement position for establishing a new maximum displacement position that decreases a maximum permitted stroke length allowed by the swashplate; determining whether pump pressure at a pump outlet of the variable displacement pump exceeds a predetermined pressure; and when the pump pressure exceeds the predetermined pressure, destroking the yoke toward the minimum or no displacement position so that the stroke length allowed by the swashplate is less than the maximum permitted stroke length.

The step of determining whether the speed of the electric motor exceeds the predetermined speed may be performed by determining whether a differential pressure across an orifice exceeds a predetermined amount. The step of actuating the displacement limiting actuator may be performed by opening a speed compensation valve for applying hydraulic pressure from the pump outlet of the variable displacement pump to the displacement limiting actuator.

In some examples, the size of the opening of the speed compensation valve varies depending on the magnitude of the differential pressure across the orifice which is proportional to the speed of the electric motor. In some examples, the method includes applying a negative moment force to the yoke for offsetting a positive moment force on the yoke that results from increasing the speed that the yoke rotates about the drive shaft axis.

In another aspect, the disclosed technology relates to a pump system having a variable displacement pump that includes a pump housing defining a pump inlet and a pump outlet. A drive shaft extends through the pump housing, the drive shaft being rotatable about a drive shaft axis. A rotating group within the pump housing is coupled to the drive shaft such that the rotating group rotates in concert with the drive shaft about the drive shaft axis. The rotating group includes a piston block defining a plurality of cylinder bores positioned about the drive shaft axis. The rotating group also includes pistons having piston bodies that reciprocate within the cylinder bores to pump hydraulic fluid through the in-line pump from the pump inlet to the pump outlet. The pistons have piston shoes.

The pump system further includes a yoke within the pump housing that carries a swashplate, and the piston shoes of the pistons of the rotating group are configured to slide along the swashplate as the rotating group rotates about the drive shaft axis. The yoke is pivotally movable relative to the drive shaft axis to adjust a swashplate angle of the swashplate relative to the drive shaft axis. The swashplate angle establishes a pump displacement of the variable displacement pump per rotation of the rotating group by establishing a stroke length of the pistons within the cylinder bores. The yoke is pivotally movable relative to the drive shaft axis between a maximum displacement position and a minimum or no displacement position. The pistons have a maximum stroke length when the yoke is in the maximum displacement position and a minimum stroke length or no stroke length when the yoke is in the minimum or no displacement position. The yoke is spring biased toward the maximum displacement position.

A pressure compensator adjusts the pump displacement based on a pump pressure at the pump outlet. The pressure compensator includes a pressure compensating actuator for moving the yoke in a de-stroking direction from the maximum displacement position toward the minimum or no displacement position. The pressure compensator also includes a pressure compensation line for applying hydraulic pressure to the pressure compensating actuator to move the yoke in the de-stroking direction. The pressure compensator also includes a pressure compensator valve for opening and closing fluid communication between the pressure compensation line and the pump outlet. The pressure compensator valve is movable between a closed position in which fluid communication is blocked between the pump outlet and the pressure compensation line, and an open position in which fluid communication is open between the pump outlet and the pressure compensation line. The pressure compensator valve is biased toward the closed position by a biasing force. The pressure compensator valve is configured to open when the pump pressure at the pump outlet exceeds the predetermined pressure.

The pump system may further include an electric motor for driving rotation of the drive shaft, a speed compensator that includes an orifice, and a fixed displacement pump coupled to the drive shaft such that the drive shaft drives rotation of the fixed displacement pump. The fixed displacement pump is configured to draw hydraulic fluid from an inlet side of the variable displacement pump and to pump the hydraulic fluid through the orifice. A speed compensation line applies hydraulic pressure to the displacement limiting actuator to move the maximum displacement position of the yoke toward the minimum or no displacement position such that a new maximum displacement position is established and a maximum permitted stroke length allowed by the swashplate is decreased. A speed compensation valve opens and closes fluid communication between the pump outlet and the speed compensation line. The speed compensation valve is biased toward a closed position where fluid communication between the pump outlet and the speed compensation line is blocked, and the speed compensation valve is configured to open fluid communication between the pump outlet and the speed compensation line when a differential pressure across the orifice exceeds a predetermined amount.

A variety of additional inventive aspects will be set forth in the description that follows. The inventive aspects can relate to individual features and to combination of features. It is to be understood that both the foregoing general description and the following detailed description are exemplary and explanatory only and are not restrictive of the broad inventive concepts upon which the embodiments disclosed herein are based.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
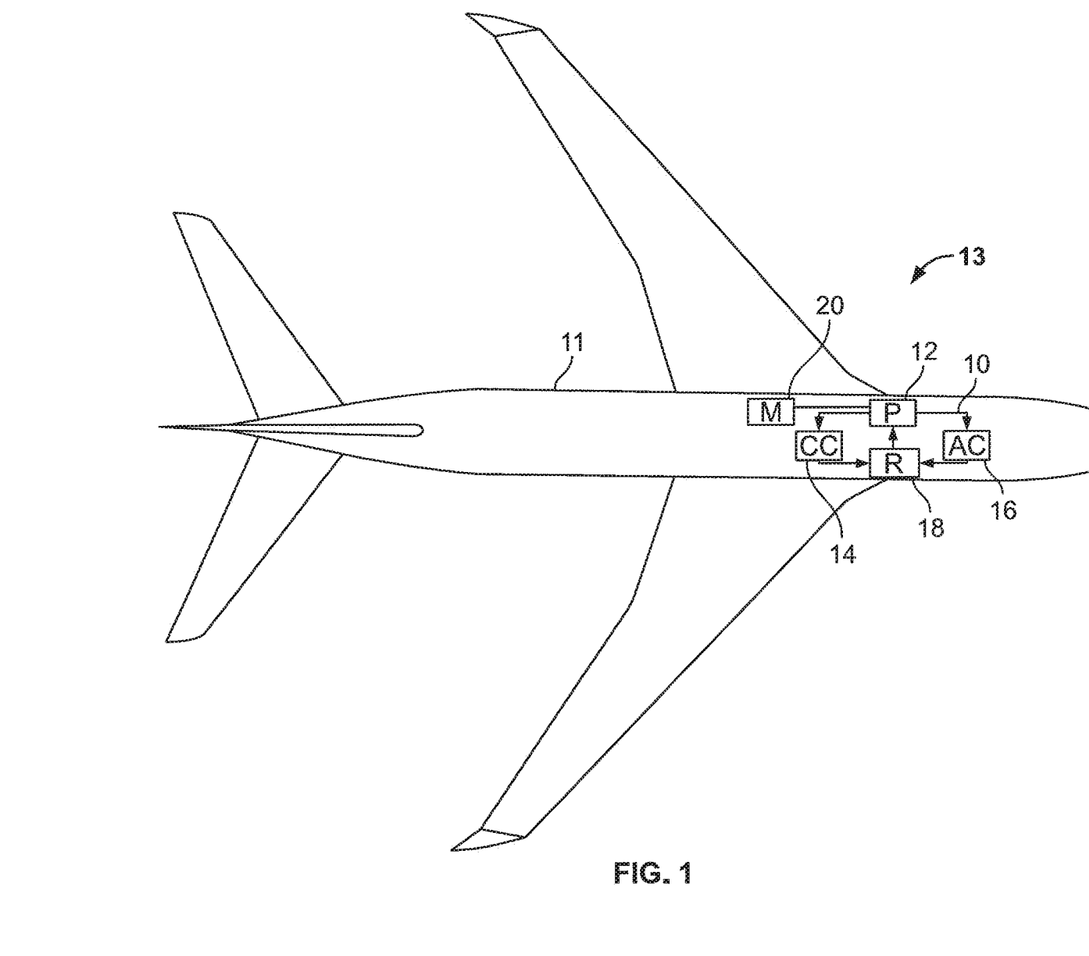
FIG. 1 is a schematic diagram of a hydraulic fluid circuit of an aircraft.

FIG. 1 is a schematic diagram of an aircraft 13 having a hydraulic fluid circuit 10. As shown in FIG. 1, the hydraulic fluid circuit 10 is located within a body 11 of the aircraft 13. The aircraft 13 may include multiple or redundant fluid circuits. The fluid circuit 10 includes at least one hydraulic pump system 12 and a cooling circuit 14 that is in fluid communication with the hydraulic pump system 12.

Also located within the body 11 of the aircraft 13 is a power source 20 for driving the hydraulic pump system 12. The power source 20 may be an aircraft engine or a motor separate from the aircraft engine. In some examples, the power supplied from the power source 20 to the hydraulic pump system 12 is a variable frequency electrical power that may vary during the flight of the aircraft 13.

The hydraulic pump system 12 uses hydraulic fluid obtained from a fluid reservoir 18 to drive active downstream components 16 (e.g., actuators, cylinders, steering units, motors, valves, etc.) of the aircraft 13. These downstream components 16 may be used to power the flight controls, landing gear, and other components of the aircraft 13. While the hydraulic pump system 12 is described herein as being suitable for use in aircraft applications, it will be appreciated that the hydraulic pump system 12 can be used for other applications as well.

Figure 2:
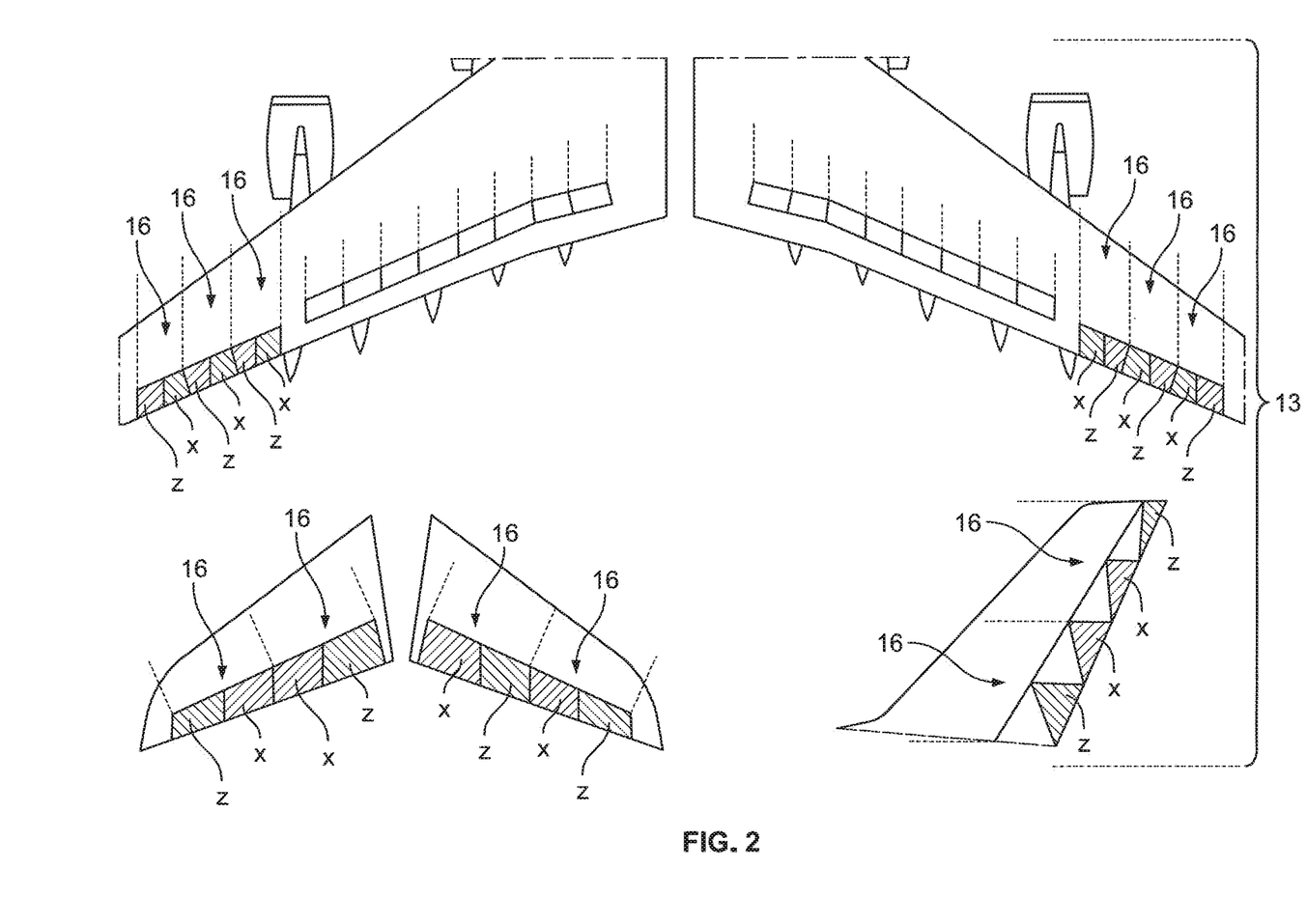
FIG. 2 is a schematic diagram of downstream components of the aircraft.

FIG. 2 is a schematic diagram of the aircraft 13 having downstream components 16 connected to multiple fluid circuits. As shown in FIG. 2, each downstream component 16 is connected to one or more fluid circuits, such as the exemplary first and second fluid circuits X, Z, so that in the case that one fluid circuit fails or malfunctions, a backup or redundant fluid circuit can be used to power the downstream component 16. While the downstream components 16 are depicted on the wings, elevators, and rudder of the aircraft 13, it will be appreciated that the downstream components 16 may also be located on other parts of the aircraft 13.

Figure 3:
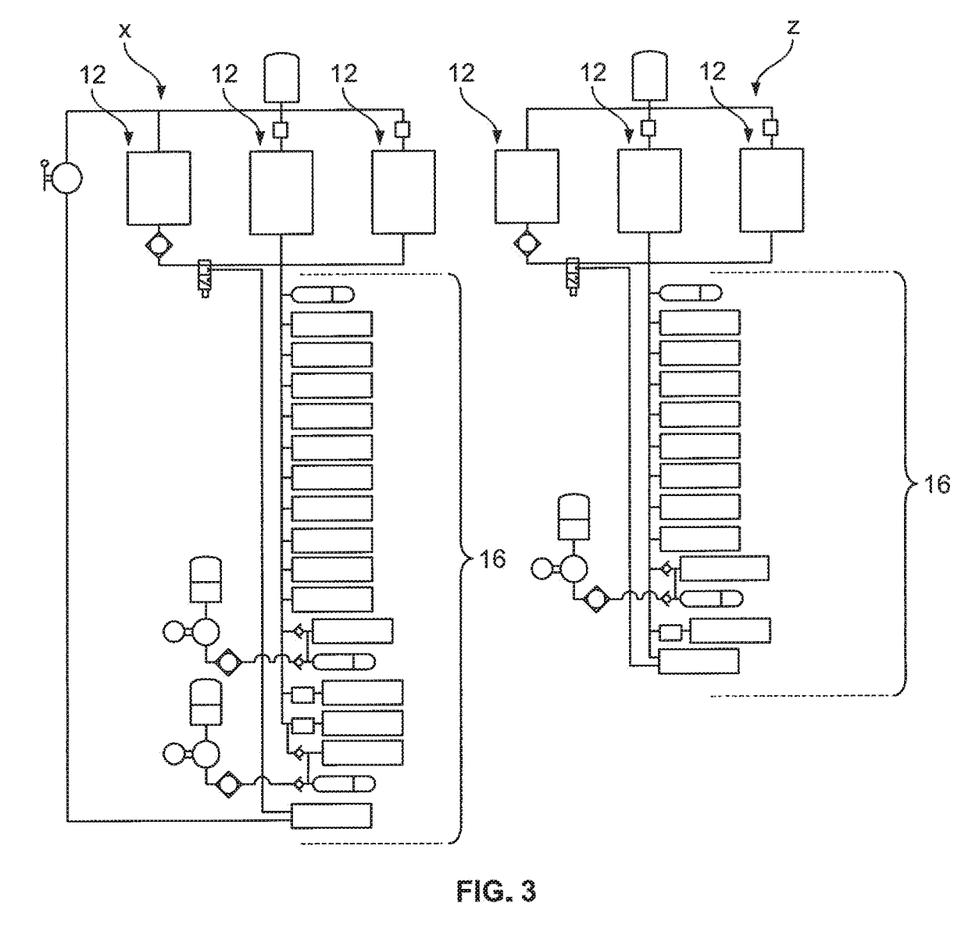
FIG. 3 is a schematic diagram of fluid circuits of the aircraft.

FIG. 3 is a schematic diagram of fluid circuits X, Z. As shown in FIG. 3, each fluid circuit X, Z may include one or more hydraulic pump systems 12. For example, the fluid circuit X may have three hydraulic pump systems 12, and the fluid circuit Z may have three hydraulic pump systems 12. The multiple hydraulic pump systems 12 add another level of redundancy so that in the case that one hydraulic pump system 12 fails or malfunctions, a backup or redundant hydraulic pump system 12 can be used for supplying fluid to the fluid circuits X, Z.

Figure 4:
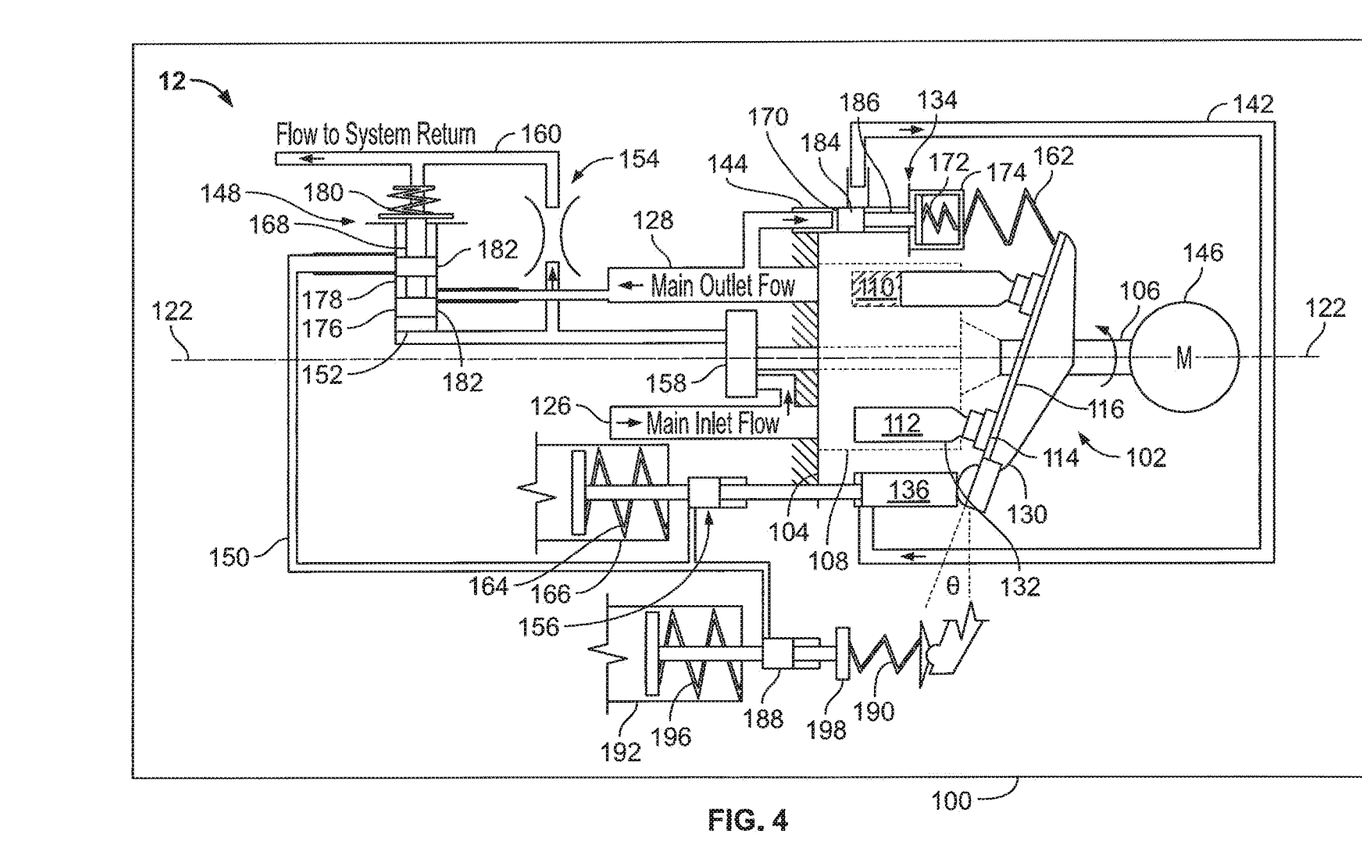
FIG. 4 is a schematic diagram of a hydraulic pump system during low speed operation.

FIG. 4 is a schematic diagram of a hydraulic pump system 12 during low speed operation. As shown in FIG. 4, the hydraulic pump system 12 includes a housing 100 that includes a pump inlet 126 and a pump outlet 128 for a variable displacement pump 102. A drive shaft 106 extends through the housing 100. The drive shaft 106 is coupled to an electric motor 146 adapted to rotate the drive shaft 106 about a drive shaft axis 122. The electric motor 146 can be powered by the power source 20 of the aircraft 13 depicted in FIG. 1.

A rotating group 104 is coupled to the drive shaft 106. The rotating group 104 includes a piston block 108 that defines a plurality of cylinder bores 110 positioned about the drive shaft axis 122. The piston block 108 is coupled to the drive shaft 106 by a mechanical connection that rotationally fixes the piston block 108 to the drive shaft 106 such that the piston block 108 and the remainder of the rotating group 104 rotate in concert with the drive shaft 106 about the drive shaft axis 122. Pistons 112 having piston bodies 132 are adapted to reciprocate within the cylinder bores 110 to pump hydraulic fluid through the variable displacement pump 102 from the pump inlet 126 to the pump outlet 128. Each piston 112 includes a piston shoe 114 attached to one end of the piston body 132 and extending from the piston block 108. The piston shoes 114 slide along a swashplate 116 as the rotating group 104 rotates about the drive shaft axis 122, and the pistons 112 reciprocate in their corresponding cylinder bores 110 as relative rotation occurs between the swashplate 116 and the rotating group 104.

The swashplate 116 is carried by a yoke 130 that is pivotally movable relative to drive shaft axis 122 to adjust a swashplate angle $\theta$ of the swashplate 116 relative to the drive shaft axis 122. The swashplate angle $\theta$ determines a displacement of the variable displacement pump 102 per rotation of the rotating group 104 by establishing a stroke length of the pistons 112 within the cylinder bores 110. The yoke 130 is pivotally movable relative to the drive shaft axis 122 between a maximum displacement position $D_0$ and a minimum or no displacement position $D_1$ (see FIG. 5). The yoke 130 is biased toward the maximum displacement position $D_0$. In some examples, the yoke 130 is biased by a yoke position feedback spring 162. The pistons 112 within the cylinder bores 110 have a maximum stroke length when the yoke 130 is in the maximum displacement position $D_0$ and the pistons 112 have a minimum stroke length or no stoke length when the yoke 130 is in the minimum or no displacement position $D_1$. The maximum stroke length results in a maximum displacement of the variable displacement pump 102 per rotation of the rotating group 104 whereas the minimum stroke length results in a minimum or no displacement of the variable displacement pump 102 per rotation of the rotating group 104.

Still referring to FIG. 4, a pressure compensator 134 adjusts the displacement of the variable displacement pump 102 based on a pump pressure at the pump outlet 128. The pressure compensator 134 includes a pressure compensator valve 144 for opening and closing fluid communication between a pressure compensation line 142 and the pump outlet 128. The pressure compensator valve 144 is movable between a closed position in which fluid communication is blocked between the pump outlet 128 and the pressure compensation line 142, and an open position in which fluid communication is open between the pump outlet 128 and the pressure compensation line 142. The pressure compensator valve 144 is biased toward the closed position by a biasing element 172. In some examples, the biasing element 172 is a pressure compensator spring housed in a housing 174. The pressure compensator valve 144 includes spool 170 that is adapted to move to the open position when the pump pressure at the pump outlet 128 exceeds a predetermined pressure. For example, when the pump pressure exceeds the predetermined pressure, the pump pressure at the pump outlet 128 acts on the spool 170 to overcome the biasing force from the biasing element 172 and to open the pressure compensator valve 144 causing fluid communication to open between the pump outlet 128 and the pressure compensation line 142.

The pressure compensation line 142 is connected to a pressure compensating actuator 136 that is adapted to receive hydraulic pressure from the pump outlet 128 when the pressure compensator valve 144 is opened. When hydraulic pressure is applied to the pressure compensating actuator 136, the pressure compensating actuator 136 moves from a rested position to an activated position causing the yoke 130 to move in a de-stroking direction from the maximum displacement position $D_0$ toward the minimum or no displacement position $D_1$. The destroking of the yoke 130 by the pressure compensating actuator 136 causes the actual stroke length $SL_A$ of the pistons 112 to be less than a maximum permitted stroke length $SL_{MAX}$ allowed by the swashplate 116 when the yoke 130 is at the maximum displacement position $D_0$.

The spool 170 of the pressure compensator valve 144 may include a body 186 and a landing 184. The diameter of the body 186 is less than the diameter of the landing 184. When the pump pressure at the pump outlet 128 decreases below the predetermined pressure, the pressure compensator valve 144 moves to the closed position. When this occurs, fluid from the pressure compensation line 142 drains to tank (e.g., the fluid reservoir 18 depicted in FIG. 1) by flowing through the pressure compensator valve 144. For example, when the spool 170 moves to the closed position, a gap is formed between the landing 184 and a surface of the pressure compensator valve 144 allowing the fluid to drain to tank. When the fluid in the pressure compensation line 142 drains to tank, the pressure compensating actuator 136 returns to the rested position and the yoke 130 returns to the maximum displacement position $D_0$ due to the yoke 130 being spring biased toward the maximum displacement position $D_0$ by the yoke position feedback spring 162.

As shown in FIG. 4, the hydraulic pump system 12 further includes a speed compensator 148 having a speed compensation valve 152, a speed sensing orifice 154, and a fixed displacement pump 158. The fixed displacement pump 158 is coupled to the drive shaft 106 and rotates in concert with the drive shaft 106 for providing a fixed displacement per rotation of the drive shaft 106. The fixed displacement pump 158 draws hydraulic fluid from pump inlet 126 of the variable displacement pump 102 and pumps the hydraulic fluid through the orifice 154.

The speed compensation valve 152 is biased by a biasing element 180 toward a closed position where fluid communication between the pump outlet 128 and a speed compensation line 150 is blocked. In some examples, the biasing element 180 is a speed compensator spring that is biased against one end of a spool 176 inside the speed compensation valve 152. In the closed position, fluid flows through the orifice 154 into a return line 160 connected to one or more hydraulic fluid reservoirs or tanks such as the fluid reservoir 18 depicted in FIG. 1. In some examples, the fluid flow in the return line 160 can be used for cooling the various components of the hydraulic pump system 12 and other systems.

During low speed operation, the motor 146 can provide adequate torque for driving the rotating group 104 of the variable displacement pump 102 at the maximum displacement position $D_0$. Accordingly, the variable displacement pump 102 can operate at a maximum displacement per rotation of the rotating group 104. During low speed operation, the speed compensator 148 is not activated and the displacement limiting actuator 156 is in the rested position. Nevertheless, the pressure compensator 134 may operate during low speed operation for moving the yoke 130 in the de-stroking direction from the maximum displacement position $D_0$ toward the minimum or no displacement position $D_1$ for adjusting the displacement of the variable displacement pump 102 based on the pump pressure at the pump outlet 128.

In some examples, the pressure compensator valve 144 is a metering valve that controls the amount of pressure applied to the pressure compensating actuator 136 proportional to the pump pressure at the pump outlet 128. Thus, during low speed operation, the position of the yoke 130 may be adjusted by the pressure compensating actuator 136 as needed between the maximum displacement position $D_0$ and the minimum displacement position $D_1$.

During high speed operation, the motor 146 cannot provide adequate torque for driving the drive shaft 106 and rotating group 104 at the maximum displacement position $D_0$. Thus, a new maximum displacement position $D_N$ is set by the speed compensator 148 for decreasing the maximum permitted stroke length $SL_{MAX}$ of the pistons 112 so that the variable displacement pump 102 does not operate at the maximum displacement per rotation of the rotating group 104.

Figure 5:
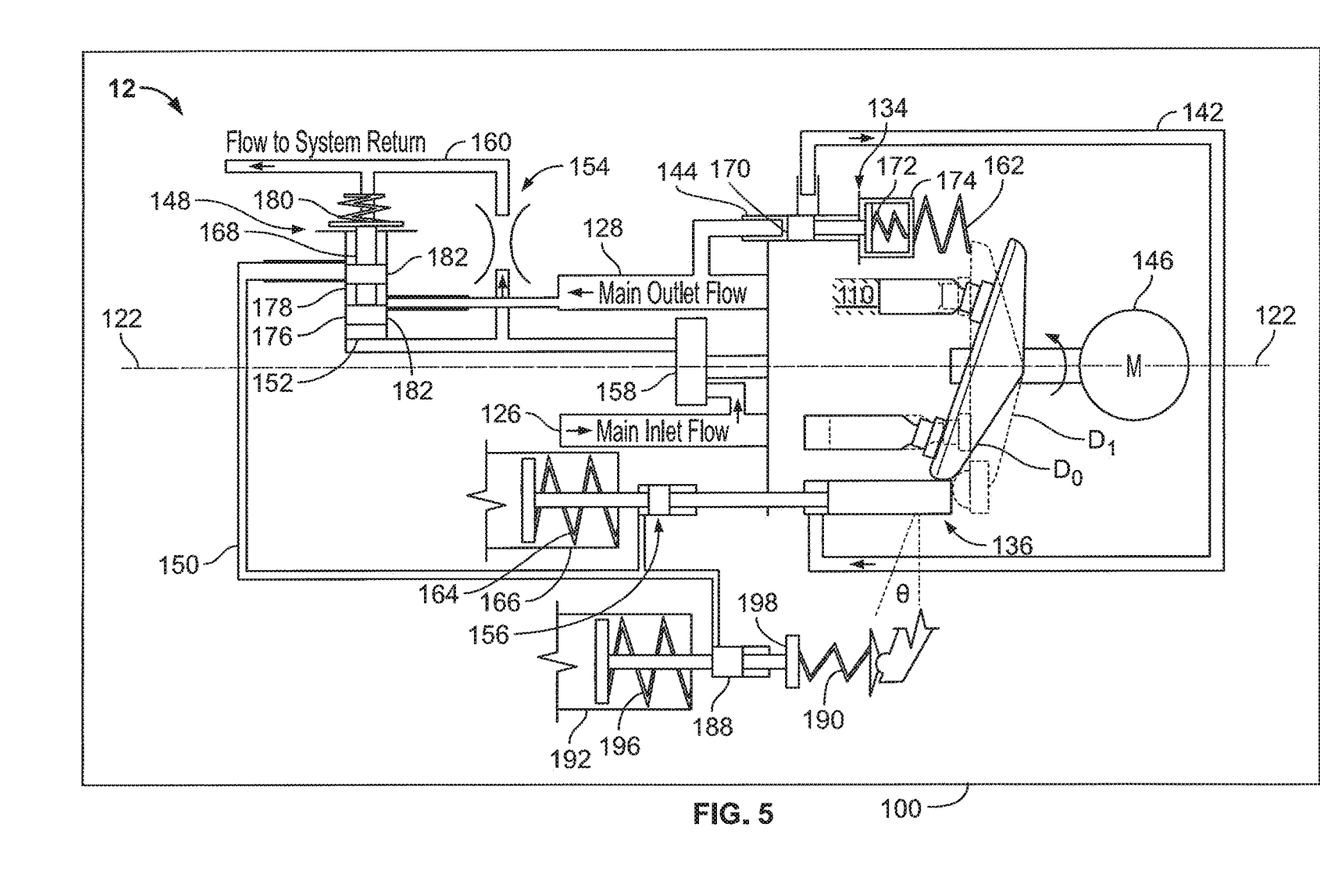
FIG. 5 is a schematic diagram of the hydraulic pump system during high speed operation.

FIG. 5 is a schematic diagram of the hydraulic pump system 12 during high speed operation. As shown in FIG. 5, the speed compensation valve 152 is adapted to move to an open position when a differential pressure across the orifice 154 exceeds a predetermined amount. The differential pressure across the orifice 154 may increase due to an increased rate of flow from the fixed displacement pump 158. When the differential pressure across the orifice 154 exceeds the predetermined amount, a pressure at an upstream side of the orifice 154 acts on an opposite end of the spool 176 overcoming the biasing force from the biasing element 180.

The speed compensation valve 152 is a metering valve that has a variable opening that depends on the magnitude of the differential pressure across the orifice 154. A large differential pressure across the orifice 154 produces a larger opening of the speed compensation valve 152 than a small differential pressure. The differential pressure across the orifice 154 is proportional to the speed of the electric motor 146 because increasing the speed of the electric motor increases the rate of flow from the fixed displacement pump 158. Accordingly, the degree to which the speed compensation valve 152 is opened is proportional to the speed of the electric motor 146.

The spool 176 can include an annular groove 178 positioned between one or more lands 182 for connecting fluid from the pump outlet 128 to the speed compensation line 150 when the pressure at the upstream side of the orifice 154 moves the spool 176 to the open position.

Hydraulic pressure from the pump outlet 128 is applied to a displacement limiting actuator 156 via the speed compensation line 150 when the speed compensation valve 152 is in the open position. The displacement limiting actuator 156 can be biased toward a rested position by a biasing element 164 housed in a housing 166. When fluid pressure flows through the speed compensation line 150, the pressure overcomes the biasing force of the biasing element 164 for moving the displacement limiting actuator 156 in a direction toward the minimum or no displacement position $D_1$. When activated, the displacement limiting actuator 156 moves the maximum displacement position $D_0$ of the yoke 130 in a direction toward the minimum or no displacement position $D_1$ such that a new maximum displacement position $D_N$ is established and the maximum permitted stroke length $SL_{MAX}$ allowed by the swashplate 116 is decreased.

The new maximum displacement position $D_N$ is positioned somewhere between the maximum displacement position $D_0$ and the minimum or no displacement position $D_1$. The new maximum displacement position $D_N$ reduces the torque required for driving the variable displacement pump 102 at the maximum permitted stroke length $SL_{MAX}$. This may help to prevent the motor 146 from getting bogged-down due to high torque demand when the variable displacement pump 102 is operating at the maximum permitted stroke length $SL_{MAX}$.

When the differential pressure across the orifice 154 decreases below the predetermined amount due to a decrease in the rate of flow from the fixed displacement pump 158 (e.g., resulting from a decrease in motor speed), the displacement limiting actuator 156 returns to the rested position, and fluid from the speed compensation line 150 drains to tank (e.g., the fluid reservoir 18 depicted in FIG. 1) by flowing through an annular groove 168 of the spool 176 in the speed compensation valve 152. Also, the swashplate 116 returns to the maximum displacement position $D_0$ due to the biasing force from the yoke position feedback spring 162.

During high speed operation, the pressure compensator 134 may continue to operate for adjusting the displacement of the variable displacement pump 102 based on the pump pressure at the pump outlet 128. However, during high speed operation, the pressure compensating actuator 136 destrokes the yoke 130 between the new maximum displacement position $D_N$ and the minimum or no displacement position $D_1$.

Figure 6:
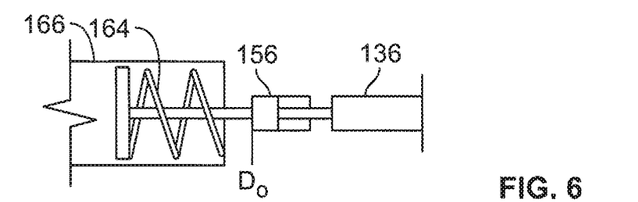
FIG. 6 shows a displacement limiting actuator and a pressure compensating actuator during low speed operation and at a maximum permitted stroke length.

FIGS. 6-11 show the displacement limiting actuator 156 and the pressure compensating actuator 136 during various speeds and stroke lengths of the variable displacement pump 102. FIG. 6 shows the displacement limiting actuator 156 and the pressure compensating actuator 136 during a low speed and maximum permitted stroke length $SL_{MAX}$ operation. As shown in FIG. 6, the displacement limiting actuator 156 and the pressure compensating actuator 136 are both in their respective rested positions, and the variable displacement pump 102 operates at the maximum displacement per rotation of the rotating group 104.

Figure 7:
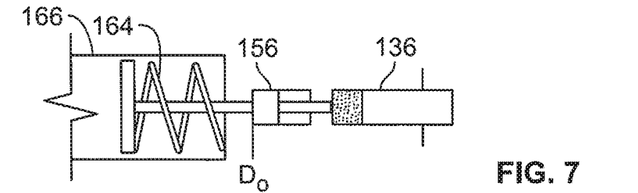
FIG. 7 shows the displacement limiting actuator and the pressure compensating actuator during low speed operation and at an intermediate stroke length.

FIG. 7 shows the displacement limiting actuator 156 and the pressure compensating actuator 136 during a low speed operation and intermediate stroke length operation. As shown in FIG. 7, the displacement limiting actuator 156 remains rested. However, the pressure compensating actuator 136 is activated (e.g., due to the pump pressure at the pump outlet 128 exceeding the predetermined pressure), and the pressure compensating actuator 136 moves in the direction towards the minimum or no displacement position $D_1$ for destroking the yoke 130 and reducing the actual stroke length $SL_A$ of the pistons 112.

Figure 8:
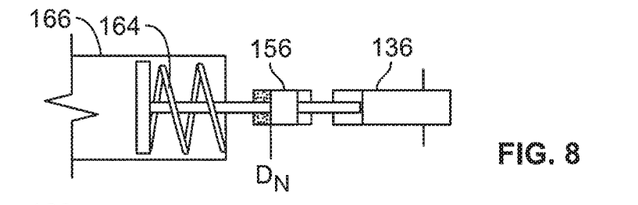
FIG. 8 shows the displacement limiting actuator and the pressure compensating actuator during medium speed operation and at a maximum stroke length.

FIG. 8 shows the displacement limiting actuator 156 and the pressure compensating actuator 136 during a medium speed operation and maximum stroke length $SL_{MAX}$ operation. As shown in FIG. 8, the displacement limiting actuator 156 creates a new maximum displacement position $D_N$ in a direction towards the minimum or no displacement position $D_1$. The pressure compensating actuator 136 is in a rested position because the new maximum displacement position $D_N$ decreases the maximum permitted stroke length $SL_{MAX}$ of the pistons 112.

Figure 9:
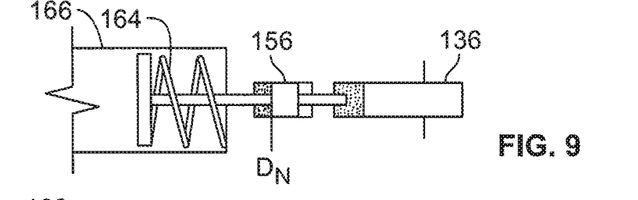
FIG. 9 shows the displacement limiting actuator and the pressure compensating actuator during medium speed operation and at an intermediate stroke length.

FIG. 9 shows the displacement limiting actuator 156 and the pressure compensating actuator 136 during a medium speed operation and intermediate stroke length operation. As shown in FIG. 9, both the displacement limiting actuator 156 and the pressure compensating actuator 136 are activated for reducing the actual stroke length $SL_A$ of the pistons 112.

Figure 10:
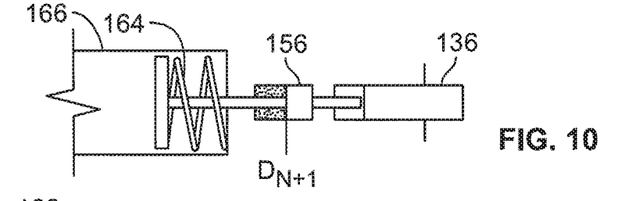
FIG. 10 shows the displacement limiting actuator and the pressure compensating actuator during high speed operation and at a maximum stroke length.

FIG. 10 shows the displacement limiting actuator 156 and the pressure compensating actuator 136 during a high speed operation and maximum stroke length $SL_{MAX}$ operation. As shown in FIG. 10, the displacement limiting actuator 156 is activated such that establishes a new maximum displacement position $D_{N+1}$ in a direction closer towards the minimum or no displacement position $D_1$. The pressure compensating actuator 136 is in a rested stated. However, due to the new maximum displacement position $D_{N+1}$, the maximum permitted stroke length $SL_{MAX}$ of the pistons 112 has decreased even further compared to the maximum permitted stroke length $SL_{MAX}$ during the medium speed operation depicted in FIG. 8.

Figure 11:
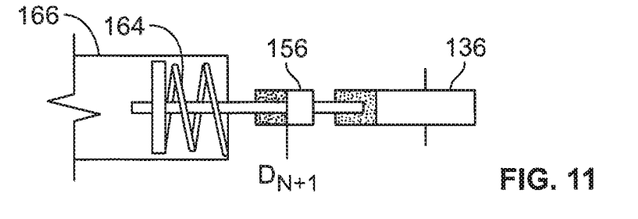
FIG. 11 shows the displacement limiting actuator and the pressure compensating actuator during high speed operation and at an intermediate stroke length.

FIG. 11 shows the displacement limiting actuator 156 and the pressure compensating actuator 136 during a high speed operation and intermediate stroke length operation. As shown in FIG. 11, both the displacement limiting actuator 156 and the pressure compensating actuator 136 are activated for reducing the actual stroke length $SL_A$ of the pistons 112. Due to the new maximum displacement position $D_{N+1}$ in a direction closer towards the minimum or no displacement position $D_1$, the actual stroke length $SL_A$ of the pistons 112 has decreased even further compared to the stroke length during the medium speed operation depicted in FIG. 9.

Figure 12:
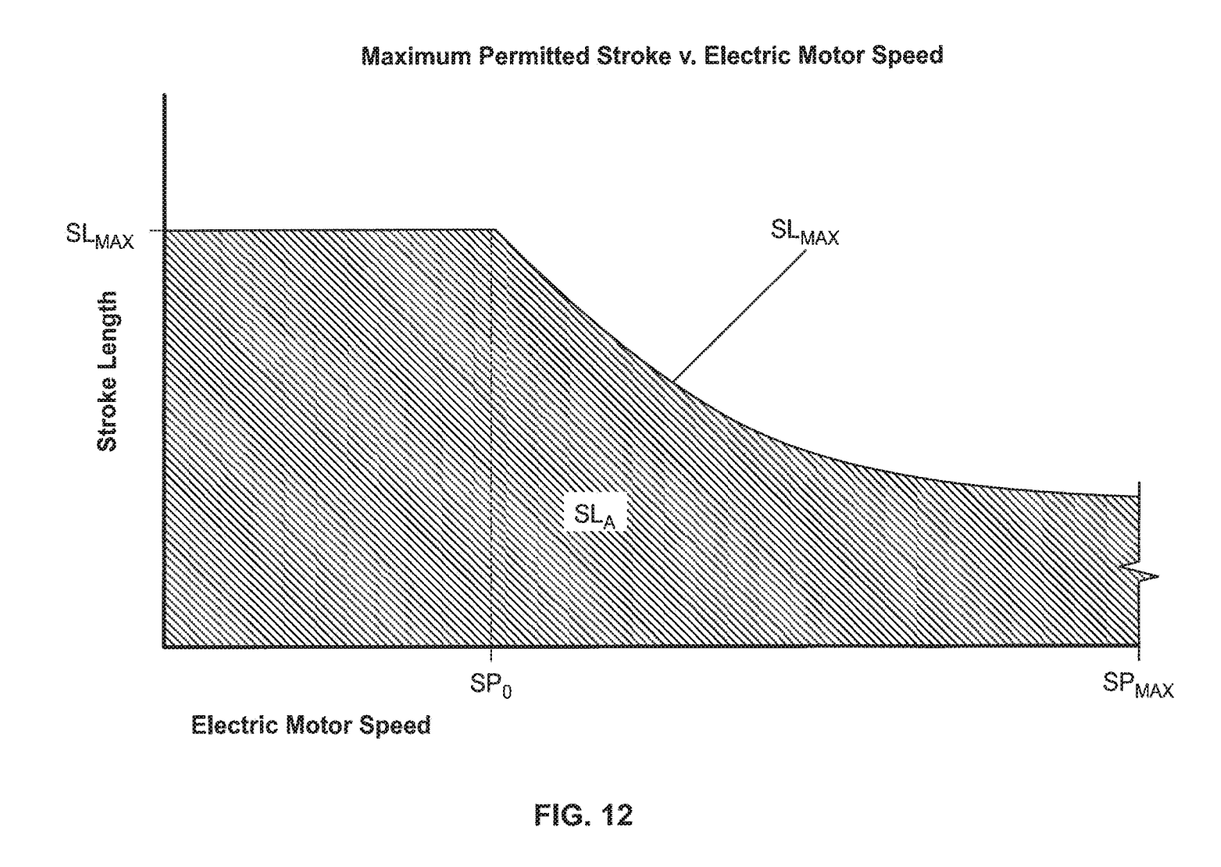
FIG. 12 is a graph depicting maximum permitted stroke v. electric motor speed.

FIG. 12 is a graph depicting maximum permitted stroke v. electric motor speed. As shown in FIG. 12, a predetermined speed threshold $SP_0$ is defined as the speed limit at which the electric motor 146 can safely operate at the maximum displacement position $D_0$ and the maximum permitted stroke length $SL_{MAX}$. When the speed of the motor 146 reaches the predetermined speed threshold $SP_0$, the displacement limiting actuator 156 is activated to move the maximum displacement position $D_0$ of the yoke 130 in a direction towards the minimum or no displacement position $D_1$. This establishes a new maximum displacement position $D_N$ for the yoke 130 that is closer to the minimum or no displacement position $D_1$.

As described above, the speed compensation valve 152 of the speed compensator 148 is a metering valve whose degree of opening depends on the magnitude of the differential pressure across the orifice 154. Thus, as the speed of the motor 146 increases, the maximum displacement position $D_N$ is moved closer towards the minimum or no displacement position $D_1$ such that the maximum permitted stroke length $SL_{MAX}$ decreases as the speed of the motor 146 increases past the predetermined speed threshold $SP_0$. In this manner, the speed compensator 148 may prevent the motor 146 from being overwhelmed by controlling the maximum permitted stroke length $SL_{MAX}$, and hence the torque required for driving the pistons 112 of the rotating group 104 at the maximum permitted stroke length $SL_{MAX}$.

Additionally, the pressure compensator 134 operates at speeds both below and above the predetermined speed threshold $SP_0$ for adjusting the stroke length of the pistons 112 based on the pump pressure at the pump outlet 128. Thus, the actual stroke length $SL_A$ of the pistons 112 of the variable displacement pump 102 is defined within the area of the curve depicted in FIG. 12.

When the hydraulic pump system 12 is installed in an aircraft, the pressure compensator 134 may frequently destroke the yoke 130 during the flight of the aircraft due to the consumers (e.g., downstream components 16) of the aircraft 13 being active during flight, and the need for the hydraulic pump system 12 to maintain a constant pressure to the consumers (e.g., downstream components 16). In contrast, the speed compensator 148 will not frequently adjust the maximum displacement position $D_0$ of the yoke 130 during the flight of the aircraft 13 because the speed compensator 148 responds to changes in the speed of the motor 146 which is determined, at least in part, by the speed of the aircraft engine. Although aircraft engine speed is generally high for takeoff and low during landing, aircraft engine speed typically does not frequently change at cruising altitude. Thus, the speed compensator 148 will typically not be as active as the pressure compensator 134 during the flight of the aircraft.

Referring back to FIGS. 4 and 5, the hydraulic pump system 12 further includes a negative yoke moment actuator 188. The negative yoke moment actuator 188 applies an additional force to the yoke 130 in a direction toward the minimum or no displacement position D1. The additional force offsets a positive moment force on the yoke 130 that results from increasing the speed of the drive shaft 106 driven by the electric motor 146.

In some examples, the negative yoke moment actuator 188 is biased toward a rested position by a biasing element 196 housed in a housing 192. When the differential pressure across the orifice 154 exceeds a predetermined amount (e.g., due to an increased rate of flow from the fixed displacement pump 158 that is the result of an increased speed of the drive shaft 106), pressure flows through the speed compensation line 150. The fluid pressure that flows through the speed compensation line 150 overcomes the biasing force of the biasing element 196 for moving the negative yoke moment actuator 188 in a direction toward the minimum or no displacement position D1. When activated, the negative yoke moment actuator 188 pushes a negative yoke moment spring 190 for applying a negative moment force on the yoke 130 of the variable displacement pump 102. The negative yoke moment spring 190 is positioned between the yoke 130 and a surface 198 of the negative yoke moment actuator 188.

As described above, the fluid in the speed compensation line 150 is drained through the annular groove 168 of the spool 176 when the speed compensation valve 152 is moved to the closed position. When the differential pressure across the orifice 154 decreases below the predetermined amount due to a decrease in the rate of flow from the fixed displacement pump 158 (e.g., resulting from a decrease in motor speed), the negative yoke moment actuator 188 returns to the rested position due to the biasing force from the biasing element 196.

Figure 13:
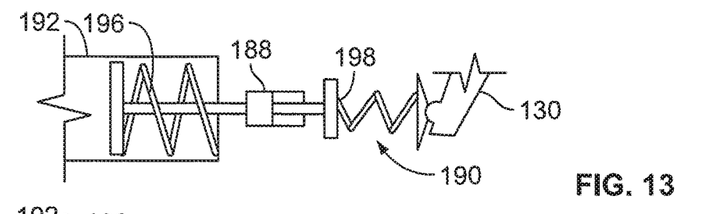
FIG. 13 shows a negative yoke moment actuator during low speed operation and at a maximum permitted stroke length.

FIGS. 13-18 show the negative yoke moment actuator 188 during various speeds and stroke lengths of the variable displacement pump 102. FIG. 13 shows the negative yoke moment actuator 188 during low speed operation and at the maximum permitted stroke length $SL_{MAX}$. As shown in FIG. 13, the negative yoke moment actuator 188 is in a rested position when the variable displacement pump 102 operates at low speed and at the maximum permitted stroke length $SL_{MAX}$. The negative yoke moment spring 190 is also in a rested state.

Figure 14:
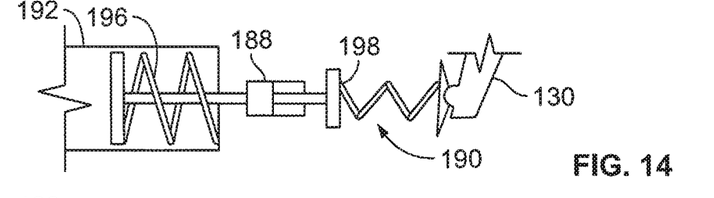
FIG. 14 shows the negative yoke moment actuator during low speed operation and at an intermediate stroke length.

FIG. 14 shows the negative yoke moment actuator 188 during low speed operation and at an intermediate stroke length. As shown in FIG. 14, the negative yoke moment actuator 188 remains in the rested position when the variable displacement pump 102 operates at low speed and at an intermediate stroke length. However, during this mode of operation, the negative yoke moment spring 190 is decompressed in a direction toward the minimum or no displacement position $D_1$ due to the yoke 130 having been moved in this direction. The yoke 130 moves toward the minimum or no displacement position $D_1$ by the pressure compensating actuator 136 when the pump pressure at the pump outlet 128 exceeds the predetermined pressure.

Figure 15:
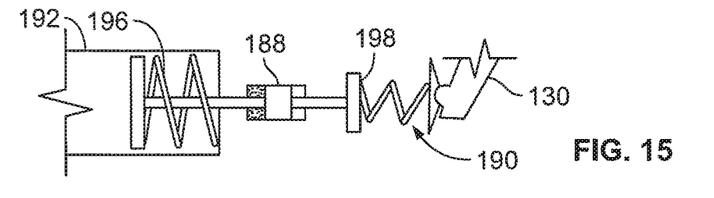
FIG. 15 shows the negative yoke moment actuator during medium speed operation and at a maximum stroke length.

FIG. 15 shows the negative yoke moment actuator 188 during medium speed operation and at the maximum permitted stroke length $SL_{MAX}$. As shown in FIG. 15, the negative yoke moment actuator 188 is compressed in a direction towards the minimum or no displacement position $D_1$. During this mode of operation, the negative yoke moment spring 190 applies a negative moment force on the yoke 130 that offsets the positive moment force applied to the yoke 130 due to the increased speed of the drive shaft 106 and electric motor 146.

Figure 16:
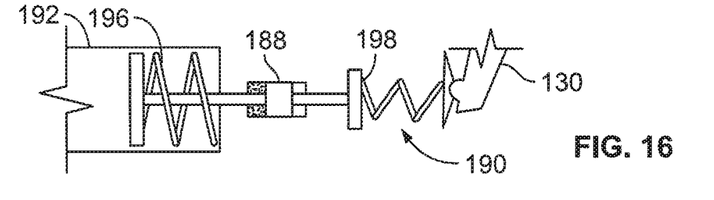
FIG. 16 shows the negative yoke moment actuator during medium speed operation and at an intermediate stroke length.

FIG. 16 shows the negative yoke moment actuator 188 during medium speed operation and at an intermediate stroke length. As shown in FIG. 16, the yoke 130 is moved in a direction towards the minimum or no displacement position $D_1$ relative to the position of the yoke 130 previously shown in FIG. 15. The yoke 130 moves toward the minimum or no displacement position $D_1$ by the pressure compensating actuator 136 when the pump pressure at the pump outlet 128 exceeds the predetermined pressure. During this mode of operation, the negative yoke moment actuator 188 and the surface 198 remain in the same position as in FIG. 15, however, the negative yoke moment spring 190 is decompressed in a direction towards the minimum or no displacement position $D_1$ due to the yoke 130 having been moved in this direction.

Figure 17:
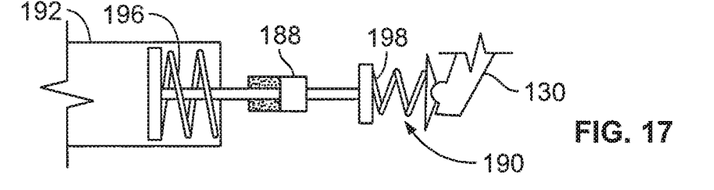
FIG. 17 shows the negative yoke moment actuator during high speed operation and at a maximum stroke length.

FIG. 17 shows the negative yoke moment actuator 188 during high speed operation and at the maximum stroke length $SL_{MAX}$. As shown in FIG. 17, the negative yoke moment actuator 188 is compressed in a direction towards the minimum or no displacement position $D_1$, and a larger negative moment force is applied by the negative yoke moment spring 190.

Figure 18:
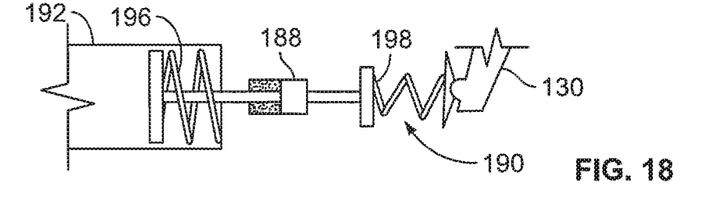
FIG. 18 shows the negative yoke moment actuator during high speed operation and at an intermediate stroke length.

FIG. 18 shows the negative yoke moment actuator 188 during high speed operation and at an intermediate stroke length. As shown in FIG. 18, the yoke 130 moves in a direction towards the minimum or no displacement position $D_1$ relative to the position of the yoke 130 in FIG. 17. As described above, the yoke 130 may be moved toward the minimum or no displacement position $D_1$ by the pressure compensating actuator 136 when the pump pressure at the pump outlet 128 exceeds the predetermined pressure. During this mode of operation, the negative yoke moment actuator 188 and the surface 198 remain in the same position as in FIG. 17, however, the negative yoke moment spring 190 is decompressed in a direction toward the minimum or no displacement position $D_1$ due to the yoke 130 having been moved in this direction.

Figure 19:
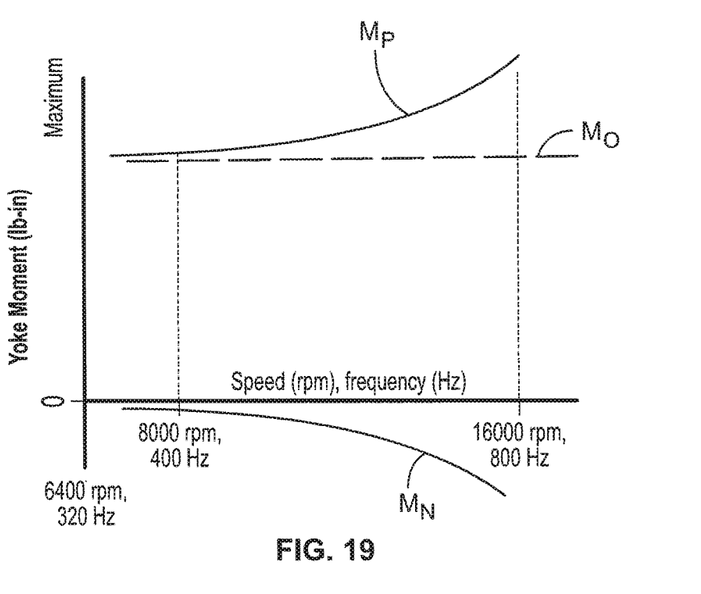
FIG. 19 is a graph depicting yoke moment v. electric motor speed.

FIG. 19 is a graph depicting yoke moment v. electric motor speed. As shown in FIG. 19, the curve $M_P$ depicts the positive moment force applied to the yoke 130 as the speed (rpm) of the drive shaft 106 increases. Curve $M_N$ depicts the negative moment force applied by the negative yoke moment actuator 188 as the speed of the drive shaft 106 increases. As shown, the normal increase in yoke moment as speed increases is offset by the moment imposed by the negative yoke moment actuator 188. Accordingly, the line $M_O$ depicts the yoke moment that must be overcome by the displacement limiting actuator 156 as the speed of the drive shaft 106 increases.

Figure 20:
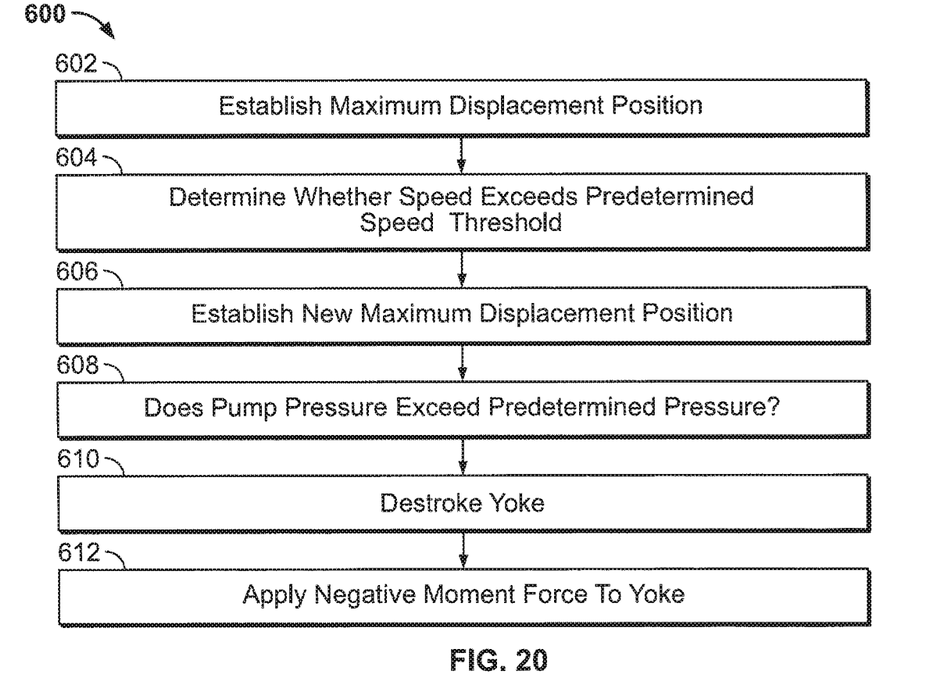
FIG. 20 is a block diagram depicting a method of controlling the displacement of a variable displacement pump.

FIG. 20 is a block diagram depicting a method 600 of controlling the displacement of a variable displacement pump. Referring now to FIG. 20, the method 600 includes a step 602 of establishing a maximum displacement position for a pivotable yoke carrying a swashplate in a variable displacement pump driven by an electric motor.

The method 600 includes a step 604 of determining whether the speed of the electric motor exceeds a predetermined speed threshold. When the predetermined speed threshold is exceeded, the method 600 includes a step 606 of actuating a displacement limiting actuator to pivot the yoke to a new maximum displacement position in a direction towards a minimum or no displacement position so that a maximum permitted stroke length is decreased.

The method 600 further includes a step 608 of determining whether pump pressure at a pump outlet of the variable displacement pump exceeds a predetermined pressure. When the predetermined pressure is exceeded, the method 600 may further include a step 610 of destroking the yoke in the direction toward the minimum or no displacement position so that the displacement pump does not operate at the maximum permitted stroke length.

In some examples, the method 600 may further include a step 612 of applying a negative moment force to the yoke for offsetting a positive moment force on the yoke that results from increasing the speed that the yoke rotates about the drive shaft axis. In some examples, step 612 may occur simultaneously with step 606 such that a negative moment force is applied while the displacement limiting actuator pivots the yoke to the new maximum displacement position.

In some examples, step 604 includes determining whether a differential pressure across an orifice exceeds a predetermined amount for determining whether the speed of the electric motor exceeds the predetermined speed threshold. In some examples, step 606 includes opening a speed compensation valve for applying hydraulic pressure from a pump outlet of the variable displacement pump to the displacement limiting actuator. In some examples, the opening of the speed compensation valve in step 606 may vary depending on the magnitude of the differential pressure across the orifice which is proportional to the speed of the electric motor.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed:

1. A pump system comprising:
   a variable displacement pump including an inlet and an outlet, the variable displacement pump having a rotating group connected to a drive shaft;
   an electric motor for driving rotation of the drive shaft, the electric motor providing a variable rotational speed;
   a pressure compensator for adjusting a pump displacement of the variable displacement pump between a maximum magnitude and a minimum magnitude based on a pump pressure at the pump outlet, the pressure compensator having a pressure compensating actuator adapted to destroke a yoke between a maximum displacement position and a minimum displacement position, the yoke carrying a swashplate on which the rotating group rotates; and
   a speed compensator for adjusting the maximum magnitude of the pump displacement inversely proportional to the variable rotational speed of the drive shaft when the variable rotational speed of the drive shaft exceeds a predetermined speed threshold, the speed compensator including:
      a fixed displacement pump connected to the drive shaft and adapted to draw hydraulic fluid from the inlet of the variable displacement pump;
      a speed compensation valve that moves from a closed position to an open position due to an increased rate of flow of the hydraulic fluid from the fixed displacement pump;
      a speed compensation line that receives the pump pressure from the pump outlet when the speed compensation valve is in the open position; and
      a displacement limiting actuator connected to the speed compensation line and adapted to decrease the maximum magnitude of the pump displacement by moving the maximum displacement position of the yoke toward the minimum displacement position, and thereby establishing a new maximum displacement position for the yoke; and
   wherein when the variable rotational speed of the drive shaft exceeds the predetermined speed threshold, the pressure compensating actuator destrokes the yoke between the new maximum displacement position and the minimum displacement position.

2. The pump system of claim 1, wherein the pressure compensating actuator is adapted to receive hydraulic pressure from the pump outlet when a pressure compensator valve is opened.

3. The pump system of claim 2, wherein the pressure compensating actuator destrokes the yoke carrying the swashplate in the variable displacement pump when the pump pressure exceeds a predetermined pressure.

4. The pump system of claim 1, wherein the speed compensation valve is a metering valve that has a variable opening proportional to the speed of the electric motor.

5. The pump system of claim 1, wherein a pressure differential across an orifice in the speed compensator is proportional to the speed of the electric motor, and when the pressure differential across the orifice exceeds a predetermined amount, a pressure at an upstream side of the orifice opens the speed compensation valve.

6. The pump system of claim 5, wherein the hydraulic fluid flows through the orifice into a return line for cooling components of the pump system.

7. The pump system of claim 1, wherein the rotating group rotates in concert with the drive shaft about a drive shaft axis, the rotating group including a piston block defining a plurality of cylinder bores positioned about the drive shaft axis, the rotating group having pistons that reciprocate within the cylinder bores to pump hydraulic fluid through the variable displacement pump from the inlet to the outlet, the pistons having piston shoes.

8. The pump system of claim 7, wherein the piston shoes of the pistons of the rotating group being configured to slide along the swashplate as the rotating group rotates about the drive shaft axis, the yoke being pivotally movable relative to drive shaft axis to adjust a swashplate angle of the swashplate relative to the drive shaft axis.

9. The pump system of claim 8, wherein the displacement limiting actuator is adapted to move the maximum displacement position of the yoke for decreasing a maximum permitted stroke length allowed by the swashplate.

10. The pump system of claim 9, wherein the pressure compensating actuator is adapted to destroke the yoke when the pump pressure at the pump outlet of the variable displacement pump exceeds a predetermined pressure such that the stroke length of the pistons of the rotating group is less than the maximum permitted stroke length allowed by the swashplate.

11. The pump system of claim 8, further comprising a negative yoke moment actuator that applies a negative moment force for offsetting a positive moment force on the yoke.

12. The pump system of claim 1, wherein the electric motor is adapted to receive variable frequency electrical power from a power source on an aircraft.

13. A method of controlling a pump displacement of a variable displacement pump, the variable displacement pump having a yoke carrying a swashplate, the variable displacement pump further having a rotating group being driven by an electric motor to rotate about a drive shaft axis, the electric motor providing a variable rotational speed for the rotating group of the variable displacement pump, and the yoke being pivotally movable relative to the drive shaft axis, the method comprising the steps of:
  establishing a maximum displacement position for the yoke;
  determining whether the speed of the electric motor exceeds a predetermined speed;
  when the variable rotational speed of the electric motor exceeds the predetermined speed, actuating a speed compensator that includes a displacement limiting actuator that is adapted to pivot the yoke toward a minimum displacement position for establishing a new maximum displacement position that decreases a maximum permitted stroke length allowed by the swashplate, the new maximum displacement position being inversely proportional to the variable rotational speed of the electric motor;
  determining whether pump pressure at a pump outlet of the variable displacement pump exceeds a predetermined pressure; and
  when the pump pressure exceeds the predetermined pressure, actuating a pressure compensator that includes a pressure compensating actuator that is adapted to further pivot the yoke from the new maximum displacement position set by the displacement limiting actuator of the speed compensator toward the minimum or no displacement position so that the stroke length allowed by the swashplate is less than the maximum permitted stroke length.

14. The method of claim 13, wherein the step of determining whether the speed of the electric motor exceeds the predetermined speed is done by determining whether a differential pressure across an orifice exceeds a predetermined amount.

15. The method of claim 14, wherein actuating the displacement limiting actuator is done by opening a speed compensation valve for applying hydraulic pressure from the pump outlet of the variable displacement pump to the displacement limiting actuator.

16. The method of claim 15, wherein the size of the opening of the speed compensation valve varies depending on the magnitude of the differential pressure across the orifice which is proportional to the speed of the electric motor.

17. The method of claim 13, further comprising applying a negative moment force to the yoke for offsetting a positive moment force on the yoke.

18. A pump system comprising:
  a variable displacement pump including:
    a pump housing defining a pump inlet and a pump outlet;
    a drive shaft that extends through the pump housing, the drive shaft being rotatable about a drive shaft axis;
    a rotating group within the pump housing, the rotating group being coupled to drive shaft such that the rotating group rotates in concert with the drive shaft about the drive shaft axis, the rotating group including a piston block defining a plurality of cylinder bores positioned about the drive shaft axis, the rotating group also including pistons having piston bodies that reciprocate within the cylinder bores to pump hydraulic fluid from the pump inlet to the pump outlet, the pistons also including piston shoes;
    a yoke within the pump housing, the yoke carrying a swashplate, the piston shoes of the pistons of the rotating group being configured to slide along the swashplate as the rotating group rotates about the drive shaft axis, the yoke being pivotally movable relative to the drive shaft axis to adjust a swashplate angle of the swashplate relative to the drive shaft axis, the swashplate angle establishing a pump displacement of the variable displacement pump per rotation of the rotating group by establishing a stroke length of the pistons within the cylinder bores, the yoke being pivotally movable relative to the drive shaft axis between a maximum displacement position and a minimum or no displacement position, the pistons having a maximum stroke length when the yoke is in the maximum displacement position and a minimum stroke length stroke length when the yoke is in the minimum displacement position, the yoke being spring biased toward the maximum displacement position;
    a pressure compensator for adjusting the pump displacement based on a pump pressure at the pump outlet, the pressure compensator including a pressure compensating actuator for moving the yoke in a de-stroking direction from the maximum displacement position toward the minimum displacement position, the pressure compensator also including a pressure compensation line for applying hydraulic pressure to the pressure compensating actuator to move the yoke in the de-stroking direction, the pressure compensator also including a pressure compensator valve for opening and closing fluid communication between the pressure compensation line and the pump outlet, the pressure compensator valve being movable between a closed position in which fluid communication is blocked between the pump outlet and the pressure compensation line and an open position in which fluid communication is open between the pump outlet and the pressure compensation line, the pressure compensator valve being biased toward the closed position by a biasing force, the pressure compensator valve being configured to open when the pump pressure at the pump outlet exceeds the predetermined pressure;
an electric motor for driving rotation of the drive shaft, the electric motor providing a variable rotational speed;
a speed compensator including:
  an orifice;
  a fixed displacement pump coupled to the drive shaft such that the drive shaft drives rotation of the fixed displacement pump, the fixed displacement pump being configured to draw hydraulic fluid from an inlet side of the variable displacement pump and to pump the hydraulic fluid through the orifice;
  a speed compensation line adapted to receive hydraulic pressure from the pump outlet;
  a displacement limiting actuator connected to the speed compensation line and adapted to move the maximum displacement position of the yoke toward the minimum displacement position such that a new maximum displacement position is established and a maximum permitted stroke length allowed by the swashplate is decreased, and the pressure compensating actuator being adapted to destroke the yoke between the new maximum displacement position and the minimum displacement position;
  a speed compensation valve for opening and closing fluid communication between the pump outlet and the speed compensation line, the speed compensation valve being biased toward a closed position where fluid communication between the pump outlet and the speed compensation line is blocked, the speed compensation valve being configured to move to an open position to open fluid communication between the pump outlet and the speed compensation line when a differential pressure across the orifice exceeds a predetermined amount, the differential pressure across the orifice being proportional to the speed of the electric motor, and when the differential pressure across the orifice exceeds the predetermined amount, a pressure at an upstream side of the orifice acts on the speed compensation valve to move the speed compensation valve from the closed position to the open position.

* * * * *